(12) United States Patent
Chuang et al.

(10) Patent No.: US 6,958,904 B2
(45) Date of Patent: Oct. 25, 2005

(54) ROTATING DISPLAY MOUNTING STRUCTURE

(75) Inventors: Chin-Ku Chuang, Taipei (TW);
Wen-Chieh Wang, Taipei (TW);
Kao-Wen Chang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/862,566

(22) Filed: Jun. 8, 2004

(65) Prior Publication Data
US 2005/0185367 A1 Aug. 25, 2005

(30) Foreign Application Priority Data
Feb. 25, 2004 (TW) .............................. 93202716 U

(51) Int. Cl.⁷ ............................................... G06F 1/16
(52) U.S. Cl. .......................... 361/683; 710/15; 475/223
(58) Field of Search .............................. 361/679–687, 361/724–727; 248/917–923; 475/223, 231; 455/566, 573.3; 710/12, 15; 715/864; 345/157–160; 386/125

(56) References Cited

U.S. PATENT DOCUMENTS

| | | | |
|---|---|---|---|
| 6,275,376 B1 * | 8/2001 | Moon | 361/683 |
| 6,522,529 B1 * | 2/2003 | Huilgol et al. | 361/681 |
| 6,801,426 B2 * | 10/2004 | Ichimura | 361/681 |
| 2005/0031317 A1 * | 2/2005 | Ikunami | 386/125 |
| 2005/0083644 A1 * | 4/2005 | Song | 361/683 |
| 2005/0099765 A1 * | 5/2005 | Wang | 361/681 |

* cited by examiner

Primary Examiner—Hung Van Duong
(74) Attorney, Agent, or Firm—Bacon & Thomas PLLC

(57) ABSTRACT

A rotating display mounting structure includes a rotating display pivotally mounted in an open frame, and two locking mechanisms adapted to lock the rotating display to the open frame. Each locking mechanism includes a top link, a bottom link, a lever coupled between the links and pivoted with a middle part thereof to the cover shell of the rotating display, and an operating member connected to one end of the lever for operation by the user to rotate the lever and to further move the top link and the bottom link into or out of respective recessed locating holes in the top and bottom frames of the open frame and to further lock or unlock the rotating display.

5 Claims, 3 Drawing Sheets

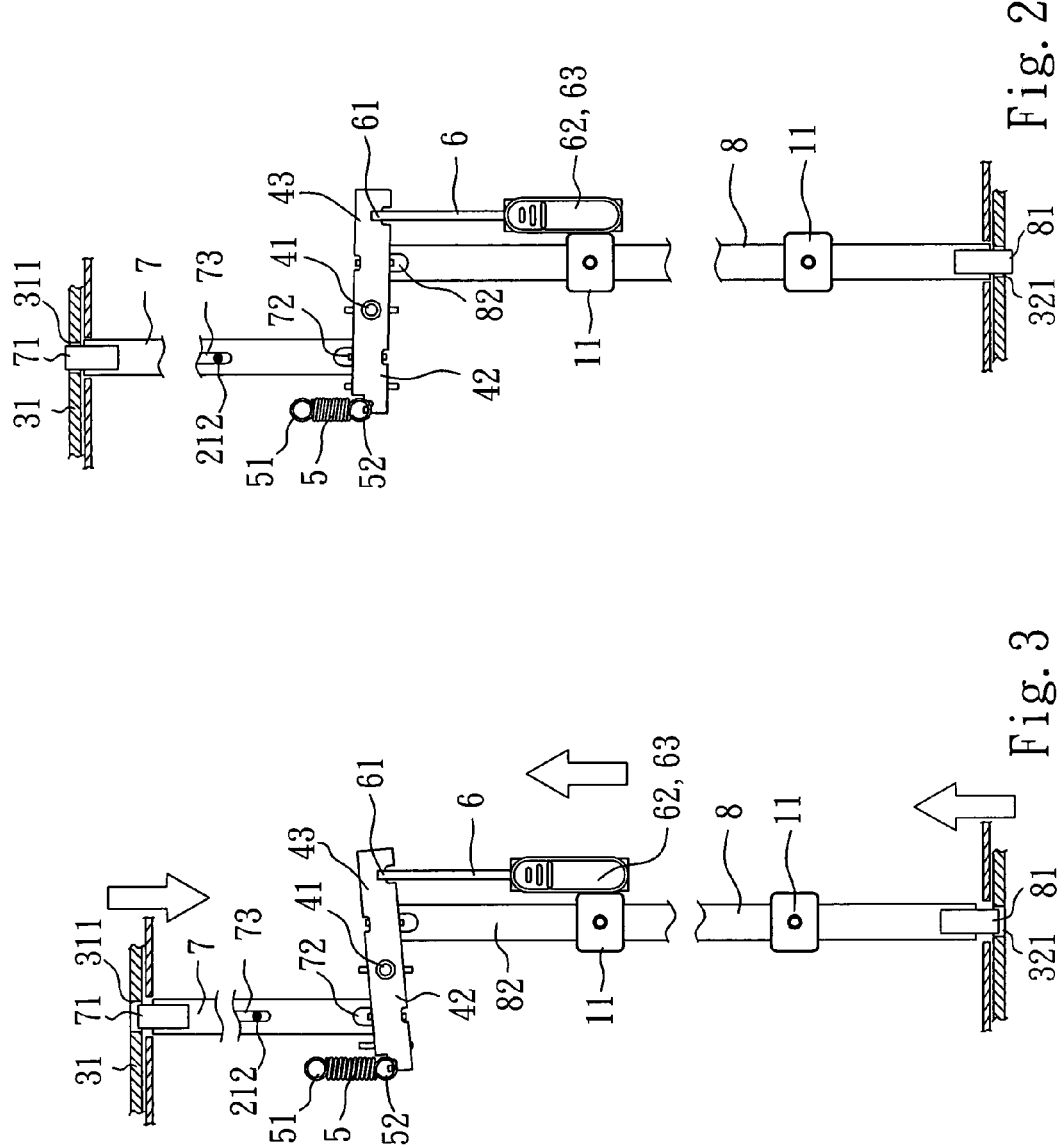

ROTATING DISPLAY MOUNTING STRUCTURE

BACKGROUND OF THE INVENTION

1. Field of the Invention

The present invention relates to positioning arrangement of a rotating display and more particularly, to a rotating display mounting structure for a dual-use portable computer.

2. Description of Related Art

A regular dual-use portable computer generally comprises a base member, and a display. The base member comprises a keyboard. The display is pivotally mounted in an open frame and the open frame is rotatable relative to the base member. This structure of dual-use portable computer functions as a tablet PC when the display is closed on the base member, or works as a notebook computer when the display is opened from the base member.

However, when rotating the display in the open frame, no means is provided to locking the display to the open frame accurately in position. Conventionally, hinges are commonly used for positioning. However, hinges for this purpose require much installation space, and are not easy to manufacture and to install. Further, hinges are still not satisfactory in function because they wear quickly with use.

SUMMARY OF THE INVENTION

The present invention has been accomplished under the circumstances in view. It is therefore the main object of the present invention to provide a rotating display mounting structure, which is easy to manufacture and convenient to use.

To achieve this and other objects of the present invention, the rotating display mounting structure comprises an open frame, a rotating display pivotally mounted in the open frame, and at least one locking mechanism adapted to lock the rotating display to the open frame. The open frame comprises a top frame and a bottom frame. The top frame and the bottom frame each have at least one recessed locating hole. The rotating display comprises a cover shell and a display panel mounted inside the cover shell. The cover shell has an inner surface.

The at least one locking mechanism is respectively mounted on the inner surface of the cover shell and diverged from the center of the inner surface of the cover shell at a distance. Each locking mechanism is comprised of a lever, a spring member, a top link, a bottom link, and an operating member.

The lever has a center pivot point pivoted to the inner surface of the cover shell. The center pivot point divides the lever into a first half part and a second half part. The spring member has a first mounting end affixed to the inner surface of the cover shell, and a second mounting end affixed to the lever for providing the lever a rotation recovering force.

The top link has a bottom connecting end connected to the first half part of the lever, and a top locating end corresponding to the at least one recessed locating hole of the top frame of the open frame. The bottom link has a top connecting end connected to the second half part of the lever, and a bottom locating end corresponding to the at least one recessed locating hole of the bottom frame of the open frame.

The operating member is connected to the lever away from the center pivot point of the lever. By means of operating the operating member to rotate the lever about the axis passing through the pivot point of the lever, the top link and the bottom link are respectively engaged into (or disengaged from) the at least one recessed locating holes of the open frame to lock (or unlock) the rotating display.

Therefore, by means of the principle of lever and a simple linking structure design, the rotating display can accurately be locked to/unlocked from the open frame, i.e., the rotating display mounting structure is easy to manufacture and to install, and convenient to use.

BRIEF DESCRIPTION OF THE DRAWINGS

FIG. 2 is a schematic drawing showing the locking mechanism locked to the open frame according to the present invention.

FIG. 3 is a schematic drawing showing the locking mechanism unlocked from the open frame according to the present invention.

DETAILED DESCRIPTION OF THE PREFERRED EMBODIMENT

Figure 1:
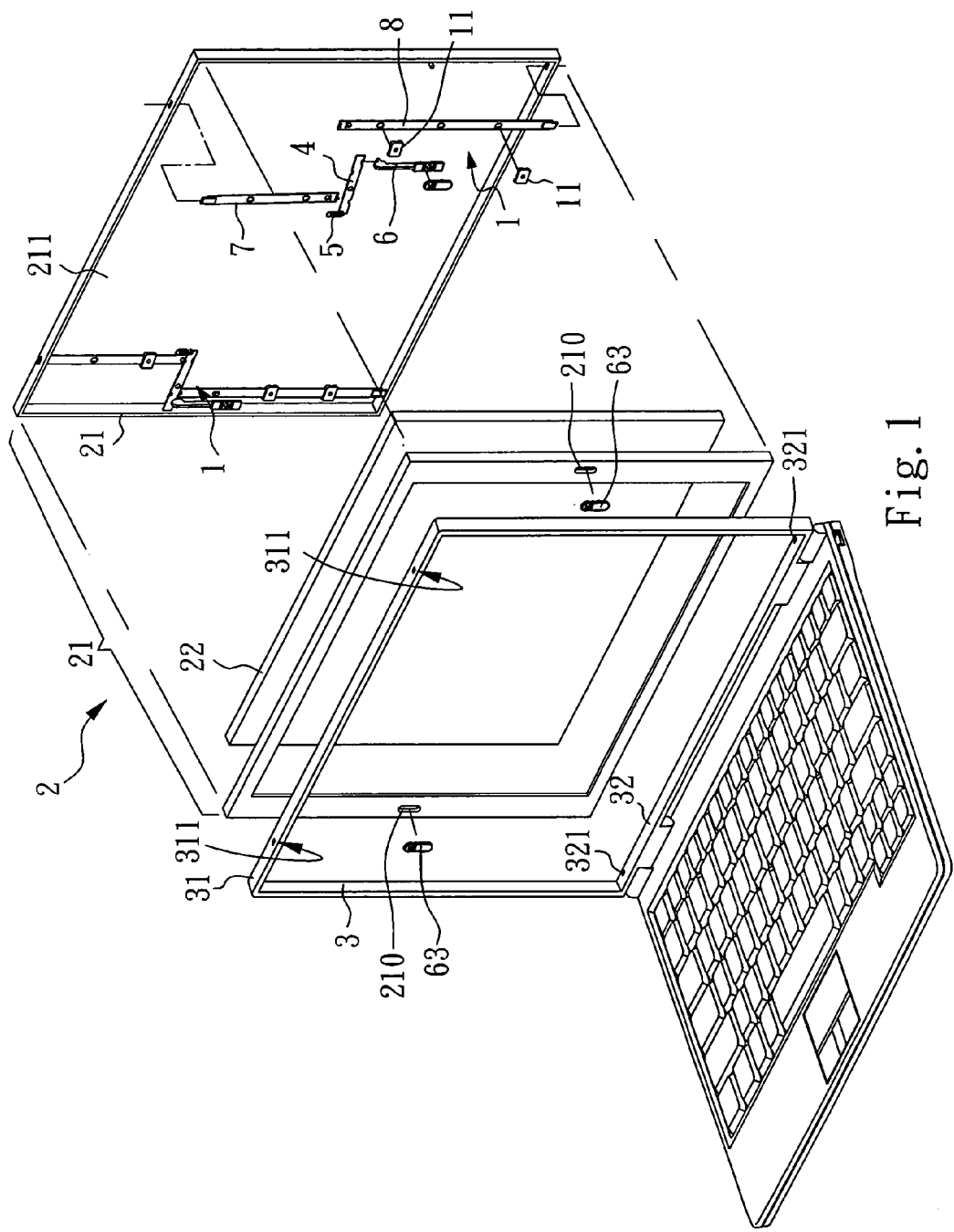
FIG. 1 is an exploded view of the preferred embodiment of the present invention.

Referring to FIG. 1, a rotating display mounting structure, for example, a vertical rotating display mounting structure in accordance with the present invention is shown comprising an open frame 3, and a rotating display 2 pivotally mounted in the open frame 3. The rotating display 2 comprises a cover shell 21, and a display panel 22 mounted within the cover shell 21. The open frame 3 comprises a top frame 31 and a bottom frame 32. The top frame 31 has two recessed locating holes 311 in the inner (bottom) side. The bottom frame 32 has two recessed locating holes 321 in the inner (top) side.

Referring to FIG. 2 and FIG. 1 again, two locking mechanisms 1 are mounted on the inner surface 211 of the cover shell 21 and bilaterally diverged from the mid point of the inner surface 211 corresponding to the recessed locating holes 311 of the top frame 31 and the recessed locating holes 321 of the bottom frame 32.

Each of the aforesaid locking mechanism 1 comprises a lever 4, a spring member 5, a top link 7, a bottom link 8, and an operating member 6. The lever 4 has a center pivot point 41 pivoted to the inner surface 211 of the cover shell 21. The center pivot point 41 divides the lever 4 into two symmetrical halves, namely, the first half part 42 and the second half part 43. The spring member 5 has a first mounting end 51 affixed to the inner surface 211 of the cover shell 21, and a second mounting end 52 affixed to one side of the first half part 42 of the lever 4. By means of this mounting arrangement, the spring member 5 is capable of imparting a prestress to rotate the lever 4 after the lever 4 having been biased.

The top link 7 has two ends, namely, the locating end 71 and the connecting end 72. The connecting end 72 is connected to the first half part 42 of the lever 4. The locating end 71 is corresponding to one of the two recessed locating holes 311 of the top frame 31 of the open frame 3. The bottom link 8 has two ends, namely, the locating end 81 and the connecting end 82. The connecting end 82 is connected to the second half part 43 of the lever 4. The locating end 81 is corresponding to one of the two recessed locating holes 321 of the bottom frame 32 of the open frame 3.

Further, the operating member 6 comprises a connecting end 61 connected to the second half part 43 of the lever 4, and an operating end 62 mounted with a knob 63. The knob 63 is slidably received in an elongated sliding slot 210 in the front surface of the cover shell 21 of the rotating display 2.

According to the present preferred embodiment, the spring member 5 and the top link 7 are provided at the top side of the lever 4, the operating member 6 and the bottom link 8 are provided at the bottom side of the lever 4.

According to the above statement, the locking mechanism 1 is capable of rotating the lever 4 by means of the spring force of the spring member 5 after the lever 4 had been biased, keeping the locating end 71 of the top link 7 and the locating end 81 of the bottom link 8 protruded over the outside wall of the cover shell 2 and respectively engaged into the corresponding recessed locating holes 311, 321 of the open frame 3. At this time, the rotating display 2 is maintained within the open frame 3.

Figure 4:
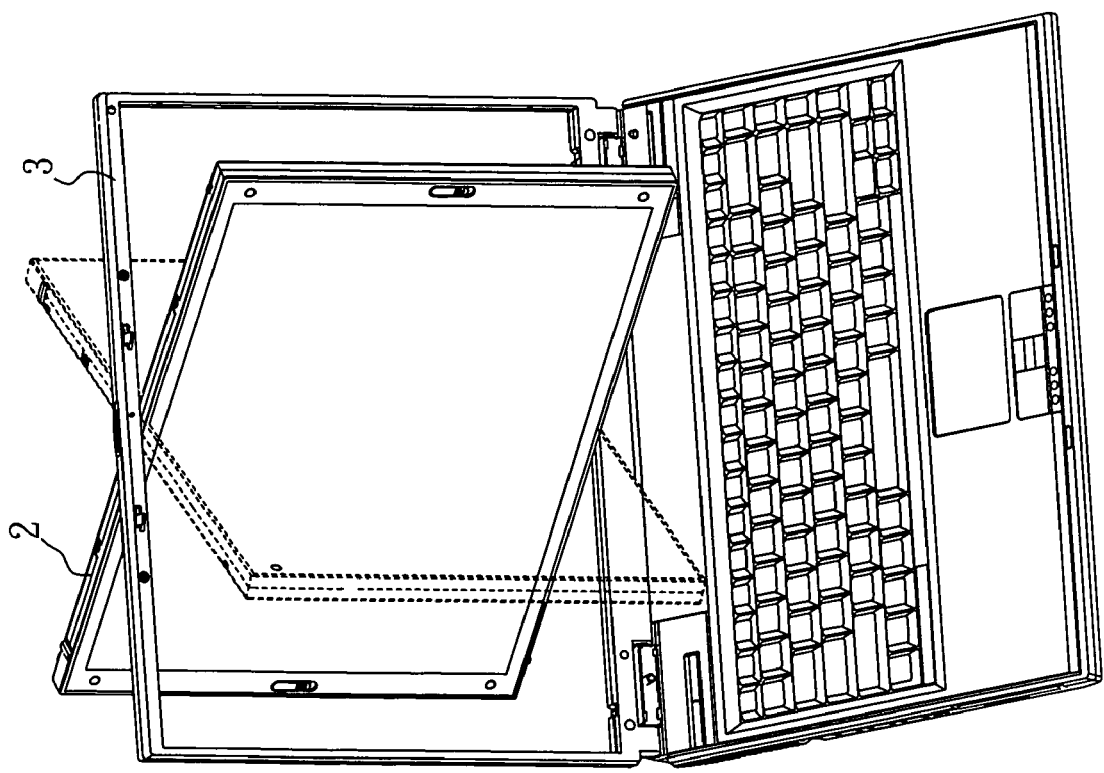
FIG. 4 is a schematic drawing showing the rotating display rotated in the open frame according to the present invention.

Referring to FIGS. 3 and 4, when wishing to rotate the rotating display 2 in the open frame 3, push the knob 63 of the operating member 6 to move the operating member 6 axially upwards and to further force the connecting end 61 of the operating member 6 against the second half part 43 of the lever 4, thereby causing the lever 4 to rotate about the axis passing through the center pivot point 41 of the lever 4. At the same time, the top link 7 and the bottom link 8 are moved axially in reversed directions by the lever 4 to disengage the respective locating ends 71, 81 from the respective recessed locating hole 311 in the top frame 31 and the respective recessed locating hole 321 in the bottom frame 32. Therefore, the rotating display 2 is unlocked, and can freely be rotated within the open frame 3.

After the rotating display 2 has been rotated in the open frame 3 through 180°, the spring prestress of the spring member 5 returns the lever 4 to the former position, and therefore the top link 7 and the bottom link 8 are respectively moved outwards to engage the respective locating ends 71, 81 into the respective recessed locating hole 311 in the top frame 31 and the respective recessed locating hole 321 in the bottom frame 32. Therefore, the rotating display 2 is locked to the open frame 3 again.

As indicated above, by means of the principle of lever and a simple linking structure design, the rotating display 2 can accurately be locked to/unlocked from the open frame 3, i.e., the rotating display mounting structure is easy to manufacture and to install, and convenient to use.

According to the present invention, the locking mechanism 1 further comprises two guide members 11 respectively fixedly mounted on the inner surface 211 of the cover shell 21 of the rotating display 2 for receiving the bottom link 8 and guiding axial movement of the bottom link 8. Further, the top link 7 comprises a longitudinal sliding slot 73, and a guide rod 212 is provided on the inner surface 211 of the cover shell 21 of the rotating display 2 and inserted through the longitudinal sliding slot 73 to guide axial movement of the top link 7.

Although the present invention has been explained in relation to its preferred embodiment, it is to be understood that many other possible modifications and variations can be made without departing from the spirit and scope of the invention as hereinafter claimed.

What is claimed is:

1. A rotating display mounting structure comprising an open frame, said open frame comprising a top frame and a bottom frame, said top frame and said bottom frame each having at least one recessed locating hole; a rotating display pivotally mounted in said open frame, said rotating display comprising a cover shell and a display panel mounted inside said cover shell, said cover shell having an inner surface; said rotating display mounting structure further comprising at least one locking mechanism respectively mounted on the inner surface of said cover shell and diverged from the center of the inner surface of said cover shell at a distance, said at least one locking mechanism each comprising:

a lever, said lever having a center pivot point pivoted to the inner surface of said cover shell, said center pivot point dividing said lever into a first half part and a second half part;

a spring member, said spring member having a first mounting end affixed to the inner surface of said cover shell and a second mounting end affixed to said lever for providing said lever a rotation recovering force;

a top link, said top link having a bottom connecting end connected to the first half part of said lever and a top locating end corresponding to the at least one recessed locating hole of said top frame of said open frame;

a bottom link, said bottom link having a top connecting end connected to the second half part of said lever and a bottom locating end corresponding to the at least one recessed locating hole of said bottom frame of said open frame; and an operating member connected to said lever away from the center pivot point of said lever.

2. The rotating display mounting structure as claimed in claim 1, wherein said operating member comprises a connecting end connected to the second half part of said lever, and an operating end for operation by the user to rotate said lever.

3. The rotating display mounting structure as claimed in claim 2, wherein said cover shell of said rotating display further comprises an elongated sliding slot in a front surface thereof; said operating member further comprises a knob mounted on said operating end and slidably received in said elongated sliding slot.

4. The rotating display mounting structure as claimed in claim 1, wherein said at least one locking mechanism each further comprises at least one guide member fixedly mounted on the inner surface of said cover shell and adapted to receive and guide movement of said bottom link.

5. The rotating display mounting structure as claimed in claim 1, wherein said top link further comprises a longitudinal sliding slot; said cover shell further comprises a guide rod provided on the inner surface of said cover shell and inserted through said longitudinal sliding slot for guiding movement of said top link.

\* \* \* \* \*